United States Patent [19]

Fukui

[11] Patent Number: 4,669,559

[45] Date of Patent: Jun. 2, 1987

[54] FOUR-WHEEL DRIVEN VEHICLES

[75] Inventor: Tetsu Fukui, Sakai, Japan

[73] Assignee: Kubota, Ltd., Osaka, Japan

[21] Appl. No.: 547,528

[22] Filed: Oct. 31, 1983

[30] Foreign Application Priority Data

Mar. 24, 1983 [JP] Japan .................................. 58-49972

[51] Int. Cl.⁴ ............................................ B62D 11/00
[52] U.S. Cl. .................................. 180/6.24; 180/6.26; 180/233
[58] Field of Search ...................... 180/6.24, 6.26, 247, 180/233, 248, 249, 250

[56] References Cited

U.S. PATENT DOCUMENTS

| 27,130 | 3/1979 | Tetsuaki | 180/6.26 |
| 2,994,392 | 8/1961 | Kosman | 180/6.24 |
| 4,470,489 | 9/1984 | Mukita | 180/6.26 |

FOREIGN PATENT DOCUMENTS

| 0007534 | 1/1977 | Japan | 180/233 |
| 0020530 | 2/1979 | Japan | 180/233 |
| 0035925 | 3/1979 | Japan | 180/233 |
| 0000463 | 1/1983 | Japan | 180/6.24 |
| 2084302 | 4/1982 | United Kingdom | 180/6.24 |

Primary Examiner—John J. Love
Assistant Examiner—Everett G. Diederiks, Jr.
Attorney, Agent, or Firm—Edwin E. Greigg

[57] ABSTRACT

A four-wheel driven vehicle including a front wheel high/low speed changeover device adapted to be set to the high speed side upon detection of at least one condition out of three conditions, i.e. an excessive turning angle of the front wheel over a predetermined angle, a low vehicle speed below a predetermined speed and actuation of either rear wheel brake.

14 Claims, 11 Drawing Figures

FOUR-WHEEL DRIVEN VEHICLES

BACKGROUND OF THE INVENTION

The present invention relates to a front-wheel drive control device in a four-wheel driven vehicle.

There is known a four-wheel driven vehicle such as an agricultural tractor travelling with two front-wheels and two rear-wheels all driven. Such vehicle is highly efficient in travelling on a rough field such as a rice field, but is disadvantageously turned with a large turning radius. Provision is therefore made such that a high/low speed changeover device in the front wheel driving system is switched to the high speed side at the time of turning, thereby to increase the front wheel peripheral speed to 2-3 times the straight travelling speed, thus decreasing the turning radius. Such changeover is made manually or automatically upon detection of the steering wheel turning angle. Accordingly, such changeover is either troublesome for the former case or attended with danger for the latter case, because the turning radius is uniformly reduced even if the vehicle travels at such high speed that reduction in turning radius involves some risk.

SUMMARY OF THE INVENTION

In view of such inconveniences in the prior art, the present invention provides a four-wheel driven vehicle in which the front-wheel speed is automatically increased only when it is judged that reduction in turning radius is absolutely required.

A four-wheel driven vehicle in accordance with the present invention comprises: a high/low speed changeover device disposed in the front wheel driving system, at least one detector for detecting an excessive turning angle of front wheels over a predetermined angle, a detector for detecting a vehicle low speed below a predetermined speed and a detector for detecting actuation of either rear wheel brake, and a changeover means for switching the high/low speed changeover device to the high speed side, based on the detection result of said detectors.

According to the present invention, the high/low speed changeover device is adapted to be switched to the high speed side upon detection of at least two conditions out of three conditions, i.e. an excessive steering angle over a predetermined one, a vehicle low speed below a predetermined speed and actuation of either brake.

Therefore, only when there appears a condition absolutely requiring to reduce the turning radius, the front wheel peripheral speed is increased to provide a quick turning with a small turning radius, thus assuring a safe and easy driving.

Preferably, when provision is made so as to detect all of three conditions above-mentioned, a safer turning with a reduced radius is assured.

Other advantages of the present invention will be apparent from the following description.

DESCRIPTION OF THE PREFERRED EMBODIMENTS

Figure 1:
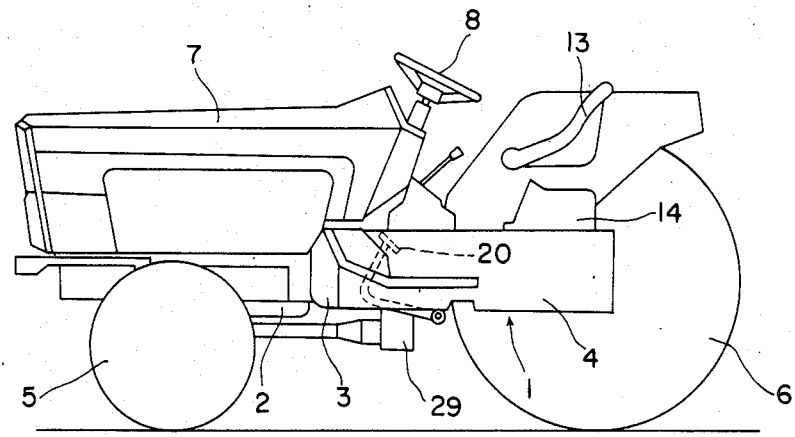
FIG. 1 is a side view of an embodiment of four-wheel driven vehicle in accordance with the present invention.

In FIG. 1, an agricultural tractor has a vehicle body 1, an engine 2, a clutch housing 3, a transmission case 4, front wheels 5, rear wheels 6, a bonnet 7, and a steering wheel 8.

Figure 3:
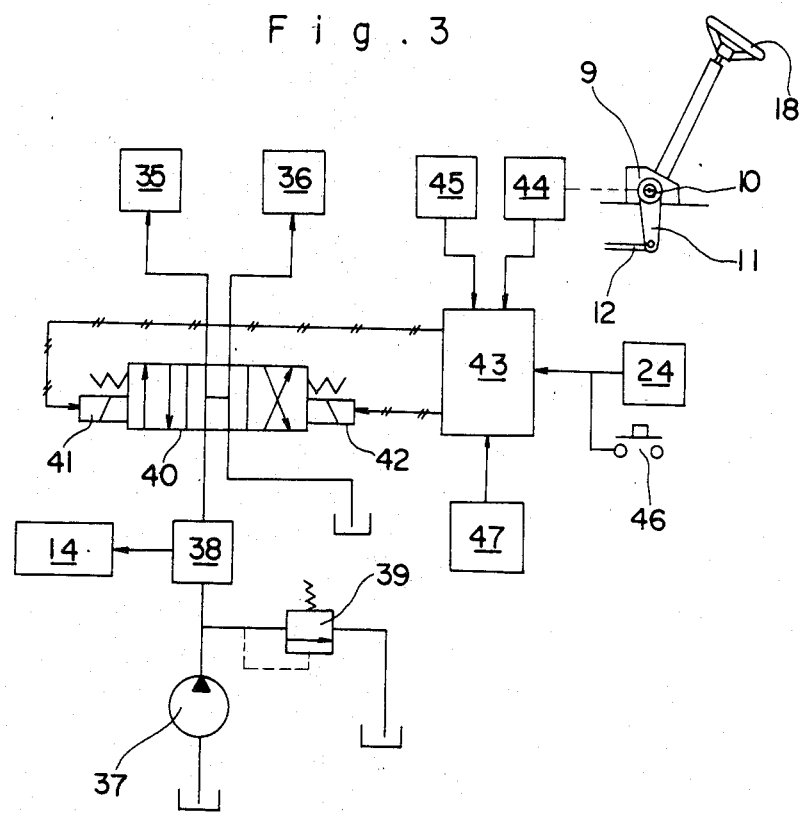
FIG. 3 is a block diagram of the control system.

As shown in FIG. 3, the front wheels 5 may be steered through a steering gear box 9, a sector shaft 10, a pitman arm 11 and a drag link 12 on the tractor vehicle body 1.

The tractor also has an operator seat 13 and a hydraulic device 14 for lifting and lowering a working machine.

Figure 2:
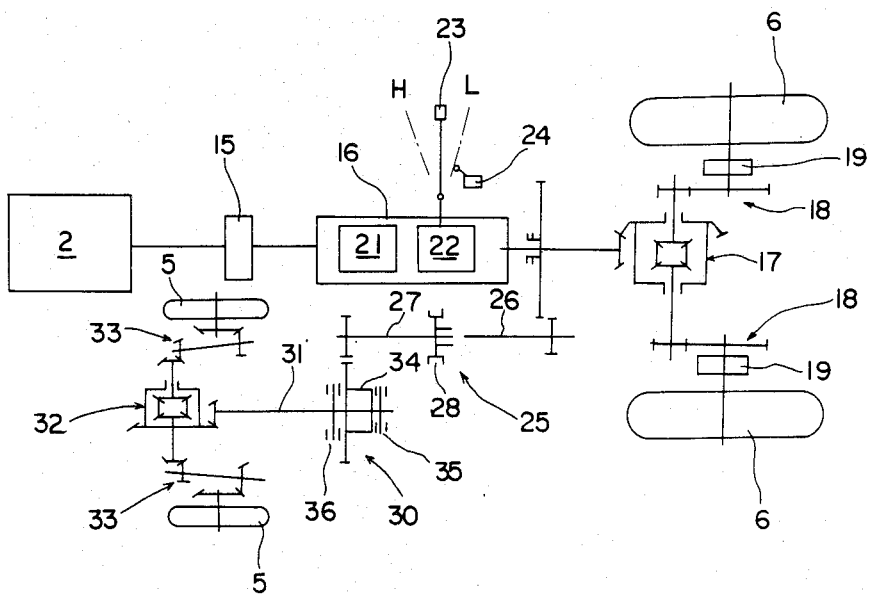
FIG. 2 is a block diagram of the power system of the vehicle in FIG. 1.

As shown in FIG. 2, the transmission case houses travelling speed change gears 16 interlocked with the engine 2 through a clutch 15, and rear wheel differential gears 17 interlocked with the rear wheels 6 through final speed reduction gears 18.

The rear wheels 6 may be braked respectively by rear wheel brakes 19 to be actuated simultaneously or individually by an interlocking or individual operation of a pair of brake pedals 20 disposed on one side of the tractor vehicle 1.

The travelling speed change gears 16 have a main speed change portion 21 and an auxiliary speed change portion 22. The main speed change portion 21 may provide a multi-step speed change with the use of a main speed change lever (not shown), while the auxiliary speed change portion 22 may provide a high(H)-/low(L) speed change with the use of an auxiliary speed change lever 23.

The auxiliary speed change portion 22 has a low speed detector 24 such as a limit switch, at its low speed side for detecting a vehicle low speed.

Disposed under the travelling speed change gears 16 are transmission shafts 26 and 27 for a front wheel driving system 25, between which a manually operable clutch 28 is disposed. The transmission shafts 26 and 27 are in parallel with the axial direction of the travelling speed change gears 16.

The transmission shaft 27 is interlocked with front wheel differential gears 32 in a front axle case through a thrust shaft 31 from a high/low speed changeover device 30 in a power take-off case 29 mounted to the underside of the transmission case 4. The front wheel differential gears 32 are interlocked with the front wheels 5 through final speed reduction gears 33.

The high/low speed changeover device 30 has a planetary speed reduction gear 34, a low speed hydraulic clutch 35 and a high speed hydraulic clutch 36. This device 30 is adapted to provide a front wheel peripheral speed of about 1.05 times the rear wheel speed when the low speed hydraulic clutch 35 is activated, and a front wheel peripheral speed of about 2-3 times the rear wheel speed when the high speed hydraulic clutch 36 is thrown.

In FIG. 3, a control system has a hydraulic pump 37, a shunt valve 38 and a relief valve 39. A three-position changeover electromagnetic valve 40 constitutes a changeover means for the hydraulic clutches 35 and 36, and has solenoids 41 and 42 to be controlled by a control circuit 43.

A turning detector 44 is adapted to be interlocked with the sector shaft 10 to detect an excessive steering angle of the steering wheel 18 over a predetermined angle. A one-side brake detector 45 is adapted to detect actuation of one rear wheel brake 19 when it is actuated with interlocking of a released pair of brake pedals 20. A switch is generally designated by 46.

A high speed detector 47 for detecting a vehicle high speed may be so constructed as to detect either a high speed provided by the auxiliary speed change portion 22, or a high speed provided by the main speed change portion 21.

The control circuit 43 is adapted to give a high speed instruction to the solenoid 42 of the electromagnetic valve 40 upon detection by all of the detectors 24, 44 and 45, and to give a low speed instruction to the solenoid 41 I5 upon detection by two detectors out of the detectors 24, 44 and 45, and to give an OFF instruction to the solenoids 41 and 42 upon detection by the high speed detector 47.

The description hereinafter will discuss how the four-wheel driven vehicle of the present invention is operated.

For cultivation of a field with a rotary machine connected to the rear of the tractor vehicle body 1, a low speed travelling is made, for example with the auxiliary speed change portion 22 set to the low speed side. At this time, the low speed detector 24 is actuated and the solenoid 41 of the electromagnetic valve 40 is excited. Then, the low speed hydraulic clutch 35 is thrown and the front wheels 5 are rotated at a peripheral speed of about 1.05 times the rear wheel speed.

Figure 4:
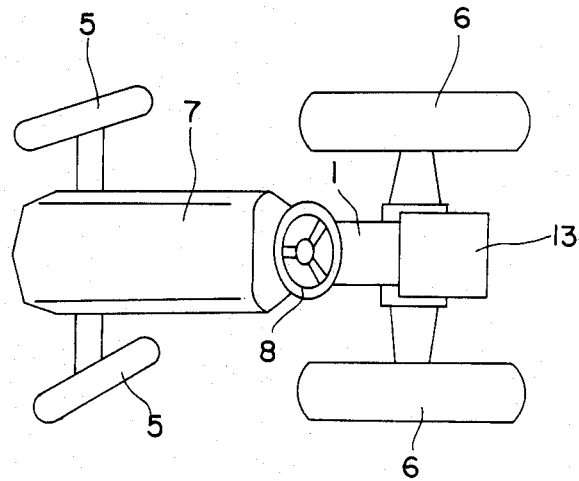
FIG. 4 is a schematic diagram illustrating how the vehicle is operated.

For turning at the end of a field, the steering wheel 8 is greatly steered in the turning direction, and the brake pedal 20 at the turning direction side, for example the left-hand brake pedal 20 for turning shown in FIG. 4, is actuated so that the left-hand rear wheel brake 19 applies braking to the left-hand rear wheel 6. The vehicle is thus turned with the left-hand rear wheel 6 serving as fulcrum. At this time, with the low speed detector 24 already actuated, the turning detector 44 is actuated and the one-side brake detector 45 is also actuated. The control circuit 43 therefore gives a high speed instruction to excite the solenoid 42 to switch the electromagnetic valve 40 thereby deactivating low speed clutch 35, so that the high speed hydraulic clutch 36 is thrown. Accordingly, the front wheels 5 are rotated with a peripheral speed that of 2-3 times of the rear wheel speed and do not constitute resistance against the rear wheels 6. Thus, a quick turning with a small radius can be made with the left-hand rear wheel 6 serving as fulcrum. After such turning, returning the steering wheel 8 to the original place or release of the brake pedal 20 causes the low speed hydraulic clutch 35 to be again activated.

For ploughing a field, travelling is made at a speed higher than that in the rotary operation, for example with the auxiliary speed change portion 22 set to the high speed side. In turning, it is required to make a quick turning with a small radius. Since the low speed detector 24 is not actuated at this time, it is necessary to have given to the control circuit 43 a signal on behalf of low speed detection with the switch 46 suitably operated.

For travelling on a road, there is made a high speed travelling with a small load. Therefore, the electromagnetic valve 40 is set to the neutral position under the action of the high speed detector 47 and the hydraulic clutches 35 and 36 are both released. In this connection, travelling on a road is made with only the rear wheels 6 driven, thereby to prevent abrasion of the front wheel tires and a useless fuel consumption of the engine 2.

Although an agricultural tractor has been shown in the embodiment discussed hereinbefore, the present invention may also be applied to other working vehicles for construction work. The detectors 24, 44, 45 and 47 may be of the contact type or of the non-contact type.

The description hereinafter will be made on another example of the high/low speed changeover device 30 with reference to FIGS. 5-7.

A transmission case constituting a tractor vehicle body has a partition wall 102. A power take-off gear case 103 is disposed under the transmission case. A PTO shaft 104 is rotatably supported by the partition wall 102. Rotatable gears 105 having two gears 105a and 105b secured to each other, are put on the PTO shaft 104 in a manner rotatable relatively with respect thereto. The gear 105a is meshed with a gear 106 put on a travelling shaft (not shown) in a manner rotatable integrally with the travelling shaft. The gear 105b is meshed with a gear 107 in the power take-off gear case 103.

This gear 107 is put on an output shaft 108 in a manner rotatable relatively with respect thereto, and the output shaft 108 is rotatably supported by the gear case 103. The gear housing 103 houses planetary gears 109 constituted by members including the gear 107 and the output shaft 108.

The planetary gears 109 have a first sun gear 110 and a second sun gear 111 integrally put on the output shaft 108. Thus, the output shaft 108 also serves as a sun gear shaft. The first sun gear 110 is meshed with a first planet gear 112, which is meshed with a first internal gear 113. The second sun gear 111 is meshed with a second planet gear 114, which is meshed with a second internal gear 115.

The first planet gear 112 is rotatably disposed, through a support shaft 118, on a first carrier 117 which is put on the output shaft 108 through a bush 116 in a manner relatively rotatable with respect to the shaft 108. Thus, the first planet gear 112 not only turns on its axis around the support shaft 118, but also moves around the output shaft 108 together with the carrier 117.

The gear 107 is secured to the first carrier 117 through a bolt 119. Thus, the first carrier 117 constitutes an input portion for the planetary gears 109.

The first internal gear 113 is externally meshed with the first planet gear 112 regardless of the rotation direction. A second carrier 120 which holds the second planet gear 114, is held by the first internal gear 113 in a spline engagement relation. The second planet gear 114 is rotatably supported by the second carrier 120 through a support shaft 121. Therefore, the second planet gear 114 not only turns on its axis around the support shaft 121, but also moves around the output shaft 108 in association with the second carrier 120 rotatable integrally with the first internal gear 113.

A second internal gear 115 is restricted or released in rotation by a high speed hydraulic clutch 122. Namely, the second internal gear 115 has at its outer periphery a spline, with which clutch plates 123 are engaged. Disposed between the clutch plates 123 is a friction plate 126 which is restricted in rotation by a clutch case 124. The clutch plates 123 and the friction plate 125 are held and released by and between a hydraulic piston 126 and a pressure receiving plate 127. The hydraulic piston 126 is secured to the power take-off gear case 103 and is slidably fitted in an annular cylinder 128 which surrounds the outer peripheral area of the first internal gear 113. The clutch case 124 is secured to the end surface of this cylinder 128.

Disposed on the output shaft 108 is a low speed hydraulic clutch 129 for rotating, integrally with the output shaft 108, an input gear 107 which is rotatable relatively with respect to the output shaft 108 and rotatable integrally with the first carrier 117. The hydraulic clutch 129 has a hydraulic piston 131 fitted, in an axially slidable manner, in an innular groove 130 formed in the end surface of the gear 107.

The piston 131 pushes, to a pressure receiving plate 135 of the clutch case 133, clutch plates 132 which cannot be rotated relatively with respect to the output shaft 108, and a friction plate 134 which is disposed between clutch plates 132 and cannot be rotated relatively with respect to the clutch case 133 secured to the end surface of the gear 107.

Disposed in the output shaft 108 is an oil path 136 through which a working oil is supplied to the annular groove 130. The oil path 136 communicates, at its one end, with the annular groove 130 through the bush 116 and the boss portion of the first carrier 117, and at its other end, with an electromagnetic valve 138 through a bearing bush 137.

The output shaft 108 has a peripheral groove 139 at its portion faced to the both openings of the oil path 136. The bushes 116 and 137 have oil holes 140 as shown in FIG. 6. Peripheral grooves 142 are formed in the boss portion of the first carrier 117 and in the inner surface of a bearing member 141 at the side of the electromagnetic valve 138. Such grooves 142 form the oil path 136.

The electromagnetic valve 138 is disposed for activating and releasing the low speed hydraulic clutch 129 and the high speed hydraulic clutch 122.

For the high speed hydraulic clutch 122, a working oil supply path (not shown) is formed so as to communicate with the annular cylinder 128 through the gear case 103.

When a pressurized oil is sent from a pressure source to a hydraulic clutch through a rotary shaft, the shaft is conventionally provided with seal ring grooves into which seal rings are put to assure sealing. Such arrangement requires other bearings, thus causing problems in view of space and costs.

Figure 5:
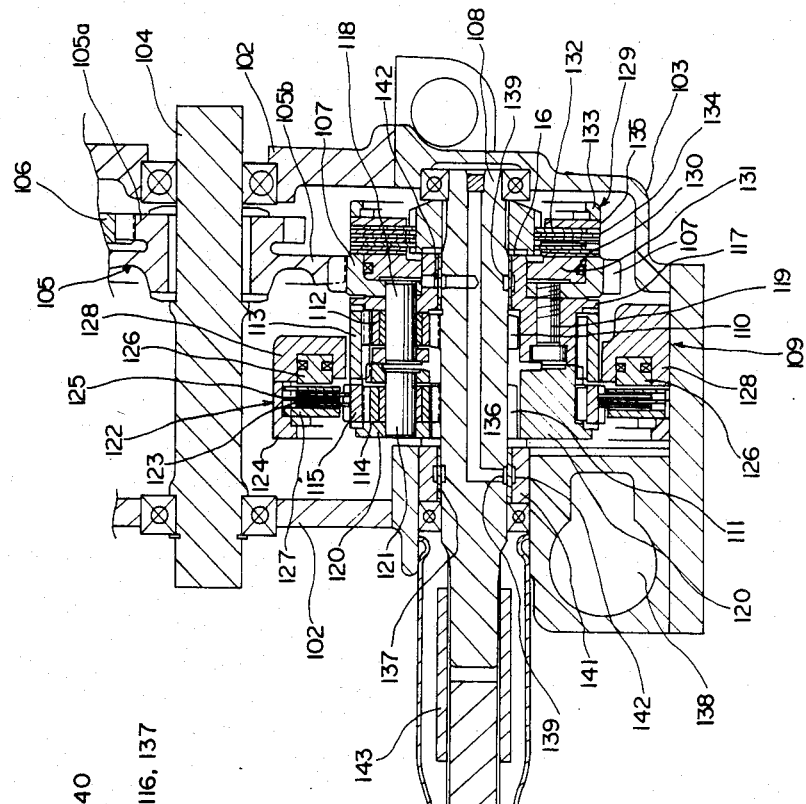
FIG. 5 is a section view of another example of a high/low speed changeover device having planetary gears.
Figure 6:
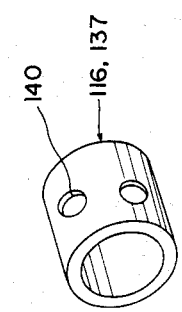
FIG. 6 is a perspective view of a bush.

As shown in FIGS. 5 and 6, the present invention uses, instead of such seal rings, bushes 116 and 137 through which a pressurized oil is supplied. Thus, the present invention advantageously eliminates the use of seal rings and bearings, and assures lubrication of the bushes to prevent seizure of the bushes to the output shaft 108.

The output shaft 108 serving also as the sun gear shaft for the planetary gears 109, projects forward from the power take-off gear case 103 and is connected, through a coupling 143, to a transmission shaft 144 which is connected to a front wheel drive device (not shown).

Power transmitted from the gear 106 on the travelling shaft to the gear 107 on the power take-off device 101 through the planet gear 105, is then transmitted to the output shaft 108 according to the following courses:

(A) For straight travelling

By a changeover operation of the electromagnetic valve 138, the high speed hydraulic clutch 122 is released and the low speed hydraulic clutch 129 is activated. Through the low speed hydraulic clutch 129, the gear 107 and the output shaft 108 are integrally rotated with each other. The speed change ratio is therefore determined by the ratio of the gear 107 to the planet gear 105 in the number of the teeth. At this time, since the first carrier 117 and the gear 107 are fixed, the planetary gears 109 are rotated with the gear 107. However, since the high speed hydraulic clutch 122 has been released, the second internal gear 115 is also integrally rotated. Thus, the planetary gears 109 effect no operation but is merely rotated together with the output shaft 108.

(B) For turning

By a changeover operation of the electromagnetic valve 138, the high speed hydraulic clutch 122 is activated and the low speed hydraulic clutch 129 is released. The gear 107 is rotatable relatively with respect to the output shaft 108, and the second internal gear 15 is restricted in rotation and stopped. The planetary gears 109 then works. In this embodiment, the rotating speed of the output shaft 108 is increased to about twice the straight travelling speed.

Figure 7:
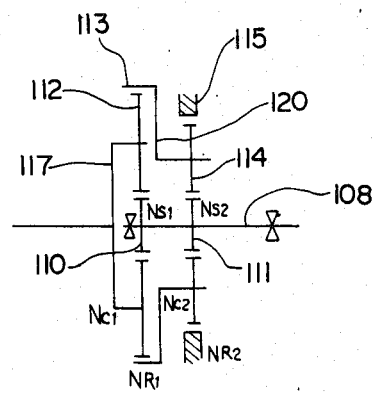
FIG. 7 is a diagram of the planetary gears in FIG. 5.

The description will be made on the specifications of the gears which provide such twice speed increase, with reference to FIG. 7 illustrating, in diagram, the construction of FIG. 5.

Where the numbers of the gear teeth are as follows:

Numbers of teeth of the first and second sun gears 110 and 111

$$Z_{s1} = Z_{s2} = 19$$

Numbers of teeth of the first and second planet gears 112 and 114

$$Z_{p1} = Z_{p2} = 17$$

Numbers of teeth of the first and second internal gears 113 and 115

$$Z_{r1} = Z_{r2} = 53$$

The speed increase ratios in the planetary gears in FIG. 7 are obtained according to the following equations:

$$\alpha_1 N_{r1} - (\alpha_1 + 1)N_{c1} + N_{s1} = 0 \qquad (1)$$

$$\alpha_2 N_{r2} - (\alpha_2 + 1)N_{c2} + N_{s2} = 0 \qquad (2)$$

where $N_{r1}$ and $N_{r2}$ are the numbers of rotations of the first and second internal gears 113 and 115, $N_{c1}$ and $N_{c2}$ are the numbers of rotations of the first and second carriers 117 and 120, and $N_{s1}$ and $N_{s2}$ are the numbers of rotations of the first and second sun gears 110 and 111.

$$\alpha_1 = \frac{Z_{r1}}{Z_{s1}} \qquad \alpha_2 = \frac{Z_{r2}}{Z_{s2}}$$

Here, since $$N_{r1}=N_{c2}, N_{s1}=N_{s2} \text{ and } N_{r2}=0, \qquad (3)$$

the equations (1), (2) and (3) are then solved to obtain $N_{s2}/N_{c1}$ as follows:

$$N_{s2}/N_{c1} = \frac{(\alpha_1 + 1)(\alpha_2 + 1)}{\alpha_1 + \alpha_2 + 1} \qquad (4)$$

Since $\alpha_1=\alpha_2=53/19=2.789$, the equation (4) is solved as follows:

$$N_{s2}/N_{c1}=2.182$$

As discussed in detail, the present invention provides a twice speed increase ratio in a limited space.

Figure 8:
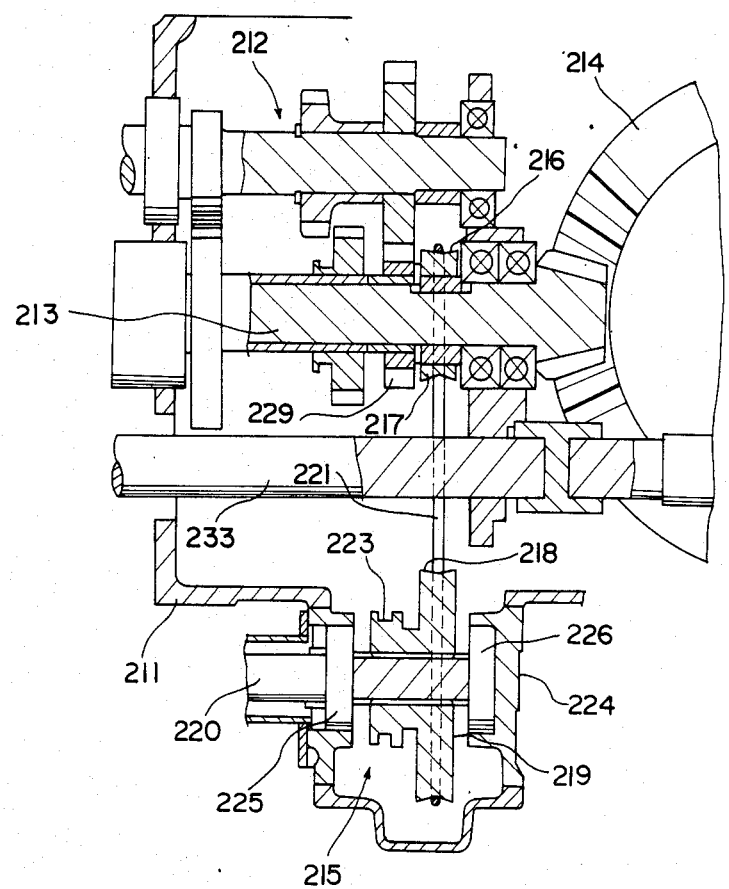
FIG. 8 is a section view of a further example of a high/low speed changeover device having a stepless speed change function.
Figure 9:
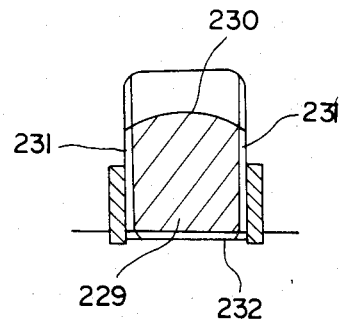
FIG. 9 is a section view of a gear having an oil path.

The description will then be made on a further example of a high/low speed changeover device 30, with reference to FIGS. 8 to 9.

A transmission case 211 constituting a vehicle body houses a gear transmission mechanism 212 interlocked with the engine through a clutch (not shown). The gear transmission mechanism 212 is adapted to drive a rear wheel differential mechanism 214 through a drive shaft 213.

A front wheel driving power take-off mechanism 215 includes a stepless speed change device of the contact type, which comprises a pulley 217 having a tapered outer periphery 216 securely put on the drive shaft 213, a pulley 219 having a tapered outer periphery 218 slidably put on a power take-off shaft 220 through a spline, and an endless belt 221 wound on the tapered portions 216 and 218 of the pulleys 217 and 219. The pulley 219 has an operating member 223, which is a shift fork engagement groove in the present example.

The power take-off shaft 220 is, through bearings 225 and 226, supported by a power take-off case 224 mounted to the lower side of the transmission case 211. The power take-off shaft 220 is interlockingly connected to the drive shaft of a front wheel differential mechanism (not shown) through a thrust shaft.

In order to increase the rOtating speed of the power take-off shaft 220 in proportion to increase in the front wheel turning angle, the shift fork is interlockingly connected to the pitman arm through an interlocking rod in the present example. That is, the pulley 219 is slidable according to the front wheel turning angle.

For a power take-off mechanism of the hydraulic stepless speed change type, the operating member is constituted by a valve, which is electromagnetically operable according to the steering wheel turning angle.

FIG. 9 illustrates a gear 229, which is a part of the gear transmission mechanism 212. This gear 229 has teeth, each of which has such convex bottom as to provide a good lubrication to the members such as a splined portion 232 requiring lubrication, through a groove 231 formed in the tooth lateral side.

In FIG. 8, there is also shown a PTO system transmission shaft 233.

The pulley 219 may be shaped so as to provide a speed increase relation with respect to the pulley 217.

The belt 221 may be either a flat or trapezoid belt. The pulley 217 may also be a flat pulley.

The description hereinafter will discuss how the present example is operated.

When the engine is started to drive the gear transmission mechanism 212, the rear wheels are driven through the differential mechanism. Since the power take-off mechanism 215 is driven through the gear transmission mechanism 212, the front wheels are driven simultaneously with the rear wheels 205 through the thrust shaft 227. The front wheels 204 are preferably rotated at a slightly faster speed than that of the rear wheels 205.

When the steering wheel 208 is steered to turn the front wheels 204, the operating member 222 is accordingly swung through the interlocking rod 228 to shift the pulley 219, so that the rotating speed of the front wheels 204 is proportionally increased. Preferably, the rotating speed of the front wheels 204 becomes about twice that of the rear wheels 205 for the maximum turning angle of the front wheels 204.

Figure 10:
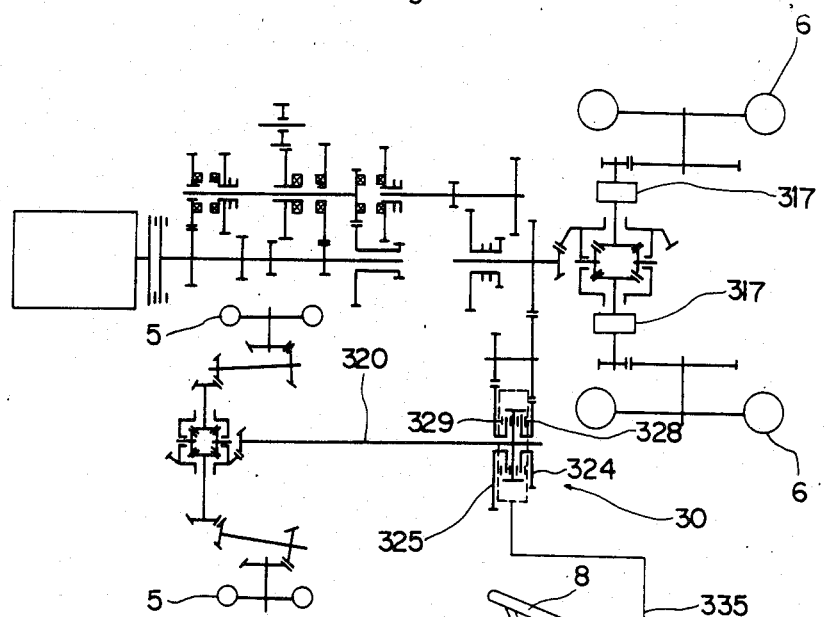
FIG. 10 is a schematic view of means for switching a high/low speed changeover device with the use of a steering wheel.
Figure 11:
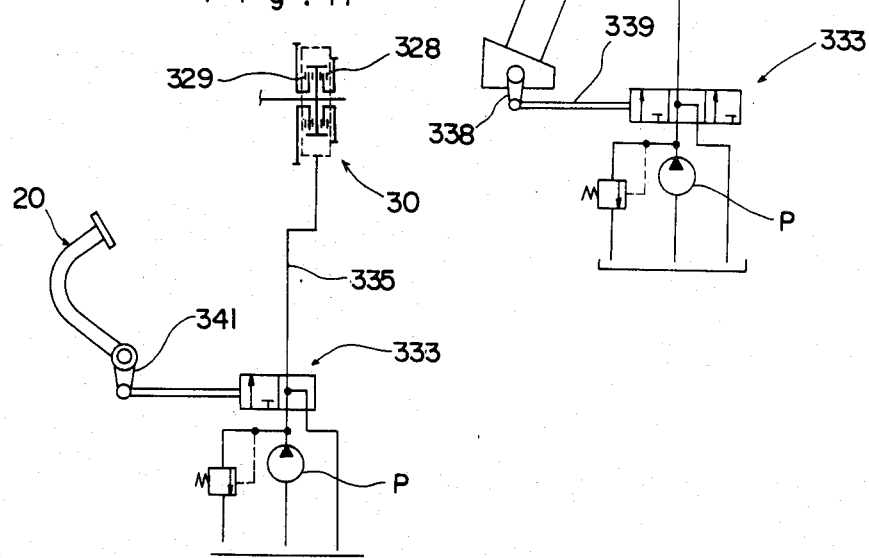
FIG. 11 is a schematic view of main portions of means for switching a high/low speed changeover device with the use of a brake pedal.

FIGS. 10 and 11 respectively illustrate different examples of a changeover means for switching the high/low speed changeover device 30 to the high speed side.

A fluid pressure changeover means 333 is interlocked with the steering wheel 8 in the example in FIG. 10, and to the brake pedal 20 in the example in FIG. 11.

In FIG. 10, a pitman arm 338 is connected to a valve operating rod 339 of a control valve 333. When the steering wheel 8 is steered, a pressurized oil from a pump is adapted to be sent to clutch means 328 through a fluid feed pipe 335, and when the steering wheel 8 is located at a straight travelling position, clutch means 329 is adapted to be thrown by spring-load.

In FIG. 11, brake arms 341 of a pair of the brake pedals 20 are pivotally connected to the valve operating rod of the control valve 333. When the brake pedal 20 is independently operated, that is, when a steering operation is made so as to individually actuate a brake device 317 (FIG. 10), a pressurized oil from the pump is sent through the fluid feed pipe 335 so as to activate the clutch means 328. When the pedals 20 are not actuated, that is, when a straight travelling is made, the clutch means 329 is thrown by spring-load.

When the tractor 1 makes a straight travelling in a field with a working machine mounted thereto through a 3-point link mechanism (not shown), the control valve 333 is switched so as to send a pressurized oil from the pump P to a drain in such direction to activate the clutch means 329. The low speed gear system 325 is interlocked with a front wheel thrust shaft 320. Thus, the front wheels 5 and the rear wheels 6 are simultaneously driven with a substantially same rotating speed. Such travelling is different from travelling made with the rear wheels 6 pulled by the front wheels 5, thus enabling a working operation under a great tractive force without an excessive slip and abrasion of the front wheels 5.

Where the tractor 1 is required to sharply turn, for example at the end portion in a field or in a housed garden, the steering wheel 8 or one of the brake pedals 20 is operated to actuate the control valve 333 for sending a pressurized oil from the pump P through the fluid feed pipe 335 in such direction as to activated the clutch means 328. The clutch means 328 then interlocks the speed increase gear system 324 with the front wheel thrust shaft 320. The rotation speed of the front wheels 5 then becomes faster than that of the rear wheels 6. In other words, travelling is made with the rear wheels 6 pulled by the front wheels 5, thus enabling the tractor 1 to be turned with a small turning radius. At this time, actuation of either brake device 317, e.g. the right-hand brake device 317 for a right turning, further improves the capability of a small sharp turn.

It is to be noted that returning the steering wheel 8 to the straight travelling position resets the low speed gear system 325.

As thus discussed hereinbefore, the present invention may be variously embodied.

I claim:

1. A four-wheel driven vehicle comprising:
   high/low speed change means incorporated in a front wheel drive system;
   low speed detector means for detecting a low vehicle speed below a preset speed and for generating a low speed signal;
   steering angle detector means for detecting a steering angle of front wheels over a present angle and for generating a turning signal;
   control means responsive to said low speed and turning signals for causing said speed change meass to shift to the high speed side thereby to accelerate rotation of the front wheels; and
   a manually operated switch for sending a low speed signal to said control means irrespective of a vehicle speed.

2. The vehicle of claim 1 further comprising high speed detector means for detecting a high vehicle speed over a preset speed and for generating a high speed signal, said control means responsive to said high speed signal for causing said speed change means to return to neutral thereby to establish a rear wheel driving.

3. The vehicle of claim 2 wherein
   said high/low speed change means comprises a planetary speed reduction mechanism, high and low speed hydraulic clutches for shifting said mechaism upon actuation by said control means.

4. The vehicle of claim 3 wherein
   said planetary speed reduction mechanism comprises first and second sun gears mounted side by side on an output shaft of said mechanism,
   a first carrier as an input of siad mechanism, said carrier rotatably mounted on said output shaft for carrying a first planetary gear in mesh with said first sun gear,
   a second carrier rotatably mounted on said output shaft for carrying a second planetary gear in mesh with said second sun gear,
   a first internal gear meshing with said first planetary gear and second carrier,
   a second internal gear meshing with said seocnd planetary gear,
   said high speed hydraulic clutch interposed between said first carrier and output shaft and shiftable to interlock said first carrier and output shaft,
   said low speed hydraulic clutch interposed between said second internal gear and a stationary clutch case and shiftable to interlock said second internal gear and clutch case.

5. A four-wheel driven vehicle comprising:
   high/low speed change means incorporated in a front wheel drive system;
   low speed detector means for detecting a low vehicle speed below a preset speed and for generating a low speed signal;
   a pair of individually operable rear wheel brakes;
   detector means for detecting actuation of one of said rear wheel brakes and for generating a brake signal;
   control means responsive to said low speed and brake signals for causing said speed change means to shift to the high speed side thereby to accelerate the front wheels; and
   a manually operated switch for sending a low speed signal to said control means irrespective of a vehicle speed.

6. The vehcile of claim 5 further comprising high speed detector means for detecting a high vehicle speed over a preset speed and for generating a high speed signal, said control means responsive to said high speed signal for causing said speed change measn to return to neutral thereby to establish a rear wheel driving.

7. The vehicle of claim 6 wherein
   said high/low speed change means comprises a planetary speed reduction mechanism, high and low speed hydraulic clutches for shifting said mechanism upon actuation by said control means.

8. The vehicle of claim 7 wherein
   said planetary speed reduction mechanism comprises first and second sun gears mounted side by side on an output shaft of said mechanism,
   a first carrier as an input of said mechanism, said carrier rotatably mounted on said output shaft for carrying a first planetary gear in mesh with said first sun gear,
   a second carrier rotatably mounted on said output shaft for carrying a second planetary gear in mesh with said second sun gear,
   a first internal gear meshing with said first planetary gear and second carrier,
   a second internal gear meshing with said second planetary gear,
   said high speed hydraulic clutch interposed between said first carrier and output shaft and shiftable to interlock said first carrier and output shaft,
   said low speed hydraulic clutch interposed between said second internal gear and a stationary clutch case and shiftable to interlock said second internal gear and clutch case.

9. A four-wheel driven vehicle comprising:
   high/low speed change means incorporated in a front wheel drive system;
   steering angle detector means for detecting a steering angle of front wheels over a preset angle and for generating a turning signal;
   a pair of individually operable rear wheel brakes;
   detector means for detecting actuation of one of said rear wheel brakes and for generating a brake signal;
   control means responsive to said turn and brake signals for causing said speed changes means to shift to the high speed side thereby to accelerate the front wheels; and
   a manually operated switch for sending a low speed signal to said control means irrespective of a vehicle speed.

10. The vehicle of claim 9 further comprising high speed detector means for detecting a high vehcile speed over a preset speed and for generating a high speed signal, said control means responsive to said high speed signal for causing said speed change means to return to neutral thereby to establish a rear wheel driving.

11. The vehicle of claim 10 wherein
    said high/low speed change means comprises a planetary speed reduction mechanism, high and low speed hydraulic clutches for shifting said mechanism upon actuation by said control means.

12. The vehicle of claim 11 wherein
said planetary speed reduction mechanism comprises first and second sun gears mounted side by side on an output shaft of said mechanism,
a first carrier as an input of said mechanism, said carrier rotatably mounted on said output shaft for carrying a first planetary gear in mesh with said first sun gear,
a second carrier rotatably mounted on said output shaft for carrying a second planetary gear in mesh with said second sun gear,
a first internal gear meshing with said first planetary gear and second carrier,
a second internal gear meshing with said second planetary gear,
said high speed hydraulic clutch interposed between said first carrier and output shaft and shiftable tointerlock said first carrier and output shaft,
said low speed hydraulic clutch interposed between said second internal gear and a stationary clutch case and shiftable to interlock said second internal gear and clutch case.

13. A four-wheel driven vehicle comprising:
high/low speed change means incorporated in a front wheel drive system;
steering angle detector means for detecting a steering angle of front wheels over a preset angle and for generating a turning signal;
a pair of individually operable rear wheel brakes;
detector means for detecting actuation of one of said rear wheel brakes and for generating a brake signal;
low speed detector means for detecting a low vehcile speed below a preset speed and for generating a low speed signal;
control means responsive to said low speed, turn and brake signals for causing said high/low speed change means to shift to the high speed side thereby to accelerate the front wheels;
high speed detector means for detecting a high tractor speed over a preset speed and for generating a high speed signal, said control means responsive to said high speed signal for causing said speed change means to return to neutral thereby to establish a rear wheel driving; and
said high/low speed change means comprises a planetary speed reduction mechanism, and high and low speed hydraulic cutches for shifting said mechanism upon actuation by said control means.

14. A four wheel driven vehicle as set forth in claim 13 which comprises:
said planetary speed reduction mechanism comprises first and second sun gears mounted side by side on an output shaft of said mechanism,
a first carrier as an input of said mechanism, said carrier rotatably mounted on said output shaft for carrying a first planetary gear in mesh with said first sun gear,
a secodn carrier rotatably mounted on said output shaft for carrying a second planetary gear in mesh with said second sun gear,
a first internal gear meshing with said first planetary gear and second carrier,
a second internal gear meshing with said second planetary gear,
said high speed hydraulic clutch interposed between said first carrier and output shaft and shiftable to interlock said first carrier and output shaft,
said low speed hydraulic clutch interposed between said second internal gear and a stationary clutch case and shiftable to interlock said secocnd internal gear and clutch case.

* * * * *